United States Patent
Trascinelli et al.

(10) Patent No.: US 8,678,800 B2
(45) Date of Patent: Mar. 25, 2014

(54) APPARATUS FOR MOLDING AND ASSEMBLING A CHAMBER UNIT FOR BIOMEDICAL USE, AND ASSOCIATED METHOD

(75) Inventors: Filippo Trascinelli, Frazione Maiatico (IT); Enrico Colombo, Moglia (IT); Filippo Branzi, Mizzole (IT)

(73) Assignee: GVS S.p.A., Zola Predosa (BO) (IT)

( * ) Notice: Subject to any disclaimer, the term of this patent is extended or adjusted under 35 U.S.C. 154(b) by 282 days.

(21) Appl. No.: 12/736,662

(22) PCT Filed: May 26, 2009

(86) PCT No.: PCT/EP2009/056358
§ 371 (c)(1),
(2), (4) Date: Oct. 27, 2010

(87) PCT Pub. No.: WO2009/144214
PCT Pub. Date: Dec. 3, 2009

(65) Prior Publication Data
US 2011/0037197 A1   Feb. 17, 2011

(30) Foreign Application Priority Data

May 28, 2008   (IT) .............................. MO2008A0164

(51) Int. Cl.
*B29C 45/14*   (2006.01)
(52) U.S. Cl.
USPC ........................................ 425/112; 425/126.1
(58) Field of Classification Search
USPC ............................................... 425/112, 126.1
See application file for complete search history.

(56) References Cited

U.S. PATENT DOCUMENTS 4,204,824 A * 5/1980 Paradis ..................... 425/436 R
5,053,101 A * 10/1991 Dromigny .................. 425/126.1
(Continued)

FOREIGN PATENT DOCUMENTS

EP         1060868 A1 * 12/2000
FR         2 848 496 A     6/2004
(Continued)

OTHER PUBLICATIONS

PCT Search Report dated Aug. 5, 2009.

(Continued)

*Primary Examiner* — Robert B Davis
(74) *Attorney, Agent, or Firm* — Hedman & Costigan, P.C.; James V. Costigan; Kathleen A. Costigan

(57) ABSTRACT

An apparatus (1) for molding and assembling a chamber unit (D) for biomedical use comprising two plates (18, 22), which are mutually parallel and opposite and are allowed to move toward and away from each other, for supporting the mold parts of a first forming mold (3) and of a second forming mold (4) for the injection molding of thermoplastic material respectively of two parts (A, B) of a chamber unit (D) that are adapted to be mutually assembled, and the mold parts of a mold (5) for the assembly, by overmolding additional thermoplastic material, of the two parts (A, B), an element supporting device (6) that is rendered movable between the plates (18, 22) by actuation means (M) and is adapted to receive the parts (A, B) from the first (3) and second (4) forming molds and to transfer them to the assembly mold (5); the element supporting device (6) is directly associated, at least slidingly, with at least one of the supporting plates (18, 22).

8 Claims, 4 Drawing Sheets

(56) References Cited

U.S. PATENT DOCUMENTS 5,527,174 A * 6/1996 Godin et al. ............... 425/126.1
6,485,285 B1 * 11/2002 Shiotani ........................ 425/556
7,241,413 B2 * 7/2007 Pfenniger et al. ............. 264/263

FOREIGN PATENT DOCUMENTS

| | | |
|---|---|---|
| FR | 2938788 A1 * | 5/2010 |
| JP | 61-029516 A | 2/1986 |
| JP | 08-034032 A | 2/1996 |
| JP | 2001-226271 A | 8/2001 |

OTHER PUBLICATIONS

Mapleston, Peter, Technique Produces Assembled Hollow Parts Out of the Mold, Modern Plastics International, McGraw Hill, Inc. Lausanne, CH, No. 12, p. 31, Dec. 1, 2002.

* cited by examiner

APPARATUS FOR MOLDING AND ASSEMBLING A CHAMBER UNIT FOR BIOMEDICAL USE, AND ASSOCIATED METHOD

TECHNICAL FIELD

The present invention relates to an apparatus for molding and assembling a chamber unit for biomedical use and to the associated method.

BACKGROUND ART

The expression "chamber unit" generally references a hollow body, known as chamber or drip, which is used in hemodialysis lines or other circuits in medical applications and has the appearance of a body that is rendered monolithic and is constituted by two parts, particularly a body (which is capsule-like) and a lid (which is flange-shaped), which are mutually assembled and sealed.

Each one of the two parts can comprise one or more tubular connectors, which are formed inside the chamber and are connected to the outside of such chamber by means of inlet and outlet ports that are adapted to be connected to the blood circuit; therefore, the chamber unit is designed to be mated with a tube that leads to a hemodialysis line or to a patient.

In particular, the chamber unit is connected in output and in input by means of connections of a known type, such as of a conical type or by adhesive bonding, to the blood circuit tube.

Moreover, it is possible to provide further connections, in a variable number and arrangement, in input and in output with respect to the chamber unit, for example controlled by auxiliary tubes such as the pressure measurement line, lines for withdrawing or administering drugs or other fluids required for therapy.

Known chamber units are usually made of thermoplastic material; the internal geometry of the chamber can have different shapes, studied to avoid the formation of clots and to ensure the correct inflow and outflow of blood and of the various fluids involved in the therapy.

The currently known methods for producing chamber units consist in forming the two parts, respectively the body and the lid, individually by injection-molding thermoplastic material, in superimposing the two parts to close the chamber body, and in sealing the parts in a monolithic body.

The formation of each one of the two parts occurs by using a respective mold; if the part to be formed has threads, particularly external ones, the corresponding female mold part is divided into at least two shells that can open in a radial direction with respect to the axis of the thread in order to allow the extraction of the formed part.

Various methods are known for sealing the two parts and include for example hot welding, ultrasound welding, adhesive bonding and overmolding of thermoplastic material at the joining point of the two parts.

Sealing by overmolding occurs by injection-molding thermoplastic material by using a mold constituted by two mold parts, in one of which there is a receptacle for one of the two parts to be sealed and in the other of which there is a receptacle for the other part, so that when the mold is closed the portions to be mutually sealed, respectively of the first and second parts formed previously, face each other.

In the two mold parts, at the joining line of the two parts, there is a female mold part for forming the sealing material to be overmolded.

Apparatuses for producing chamber units currently comprise molds for forming the individual parts to be assembled and mold for sealing them by overmolding, which are mutually separated and mutually independent and are mounted on respective separate presses.

These apparatuses for performing the known methods are riot free from drawbacks, which include the fact that they are structurally and constructively complex and bulky and difficult to manage, have a limited production rate and relatively high installation and operating costs, and this leads to a significant increase in the production times and costs of chamber units.

By way of example, it is in fact noted that known systems require the availability of large work areas to provide various stations for forming and sealing the parts, each station being provided with respective molds, presses and devices for gathering the individual or assembled parts, it being further necessary to transfer the parts from the forming stations to the sealing stations and arrange them in the sealing molds.

DISCLOSURE OF THE INVENTION

The aim of the present invention is to eliminate the above-mentioned drawbacks, by providing an apparatus for molding and assembling a chamber unit for biomedical use and the corresponding method, which allows to produce easily, quickly and cheaply chamber units with an apparatus that is structurally and constructively simple, has a low space occupation, is easy to manage and has an improved production rate.

Within this aim, an object of the invention is to provide steps for transferring the formed and assembled parts that are quick to perform and at the same time highly precise, so as to increase the efficiency of said apparatus, reducing its idle times.

Another object of the present invention is to provide an apparatus that is simple, relatively easy to provide in practice, safe in use, effective in operation, and has a relatively low cost.

This aim and these and other objects, which will become better apparent hereinafter, are achieved by the present apparatus for molding and assembling a chamber unit for biomedical use, which comprises two plates, which are mutually parallel and opposite and are allowed to move toward and away from each other, for supporting the mold parts of a first forming mold and of a second forming mold for the injection molding of thermoplastic material respectively of two parts of a chamber unit that are adapted to be mutually assembled, and the mold parts of a mold for the assembly, by overmolding additional thermoplastic material, of said two parts, an element supporting device that is rendered movable between said plates by actuation means and is adapted to receive said parts from said first and second forming molds and to transfer them to said assembly mold, characterized in that said element supporting device is directly associated, at least slidingly, with at least one of said supporting plates.

BRIEF DESCRIPTION OF THE DRAWINGS

Further characteristics and advantages of the present invention will become better apparent from the following detailed description of a preferred but not exclusive embodiment of an apparatus for molding and assembling a chamber unit for biomedical use, illustrated by way of non-limiting example in the accompanying drawings, wherein.

WAYS OF CARRYING OUT THE INVENTION

Figure 1:
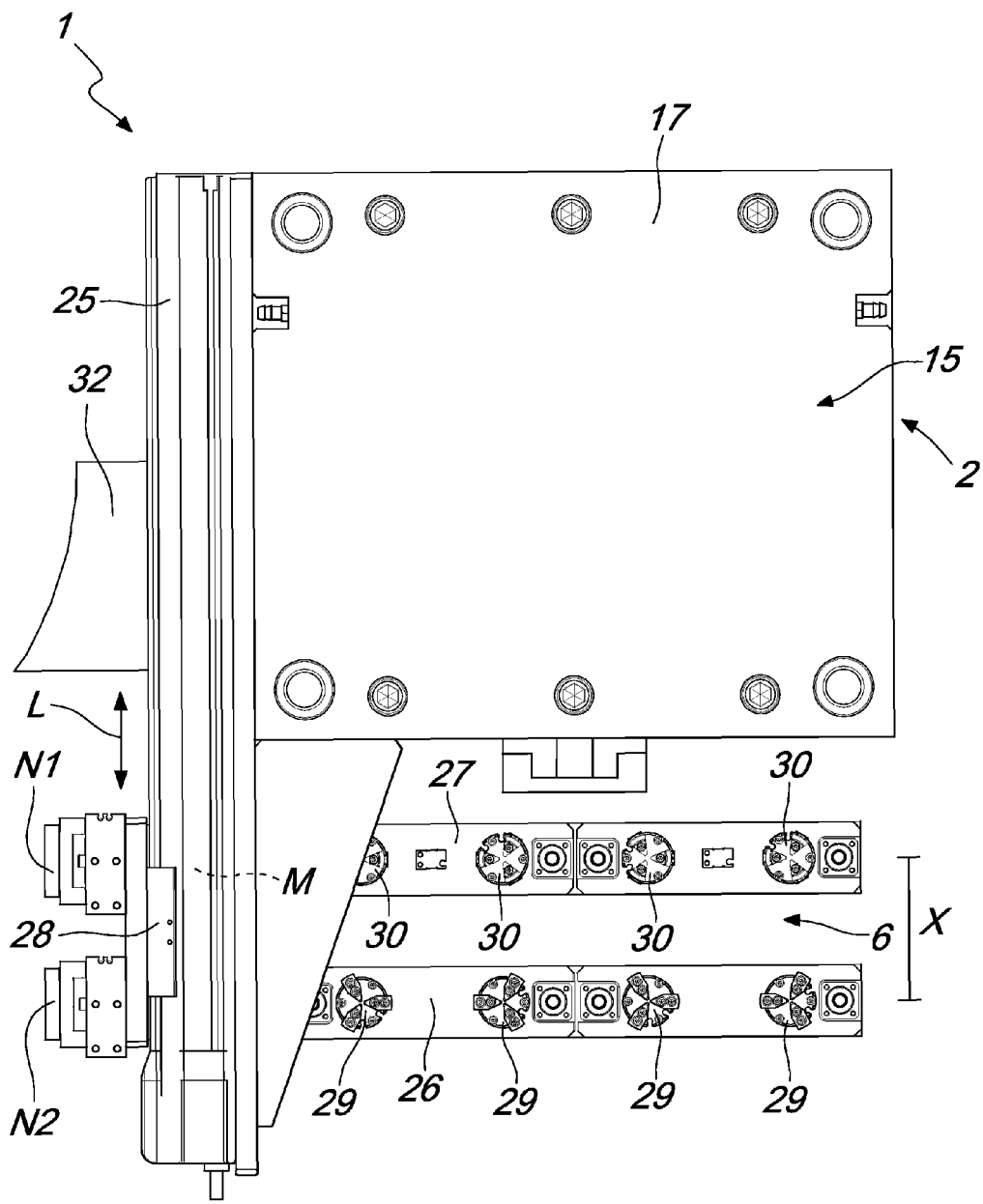
FIG. 1 is a schematic front view of a modular portion of an apparatus according to the invention.

With reference to the figures, the reference numeral 1 generally designates an apparatus for molding and assembling a chamber unit D for biomedical use.

The body of the chamber units D is constituted by two separate parts A and B, which are mutually assembled and sealed in a single monolithic part by means of the overmolding of additional thermoplastic material C that provides a seal.

The apparatus 1 comprises a unit 2 for producing the chamber units D, in which there are at least the mold parts of a first forming mold 3 and of a second forming mold 4, for the molding, by injection of thermoplastic material, respectively of the two parts A and B and at least the mold parts of a mold 5 for the assembly and sealing, by overmolding thermoplastic material, optionally different from the preceding one, of the two formed parts A and B.

The apparatus 1 further comprises an element supporting device 6, which is adapted to receive the parts A and B from the first and second forming molds 3 and 4 and transfer them to the assembly mold 5.

Figure 2:
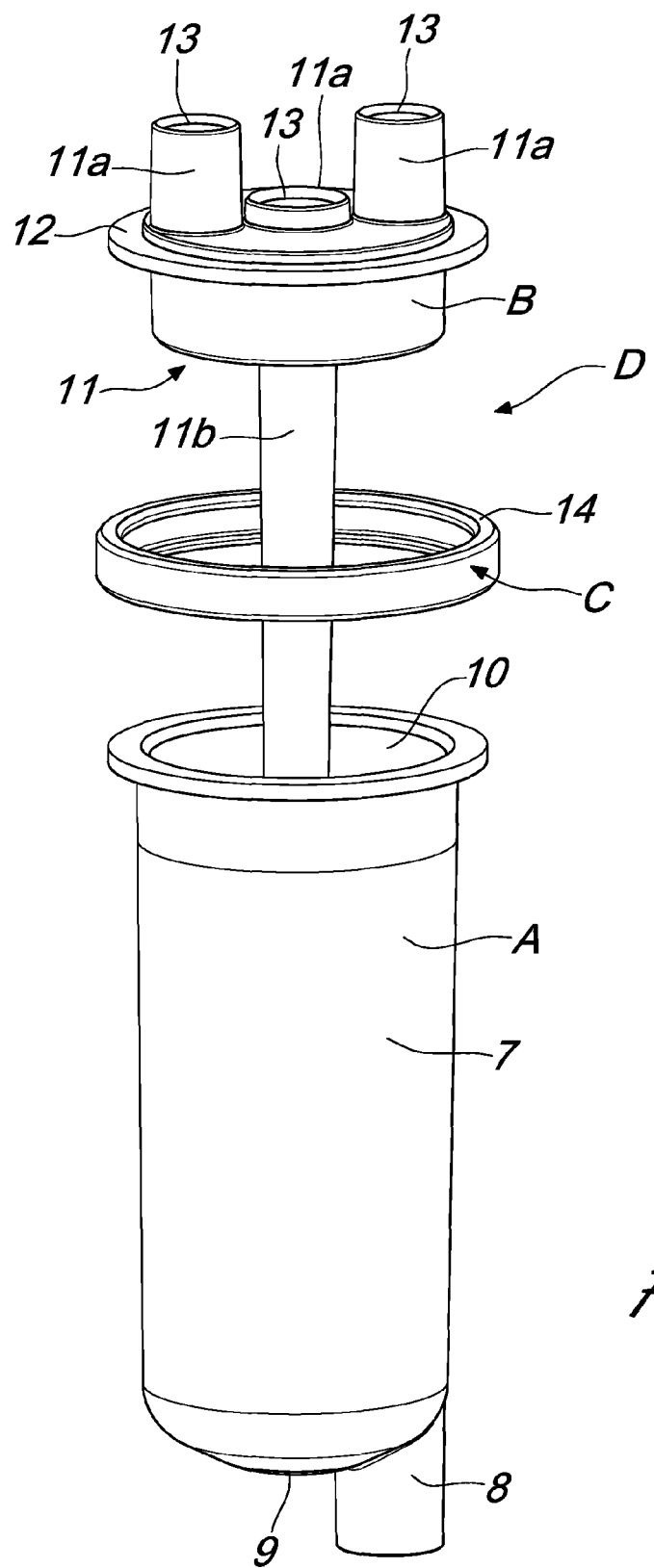
FIG. 2 is an exploded perspective schematic view of a chamber unit that can be obtained with the apparatus according to the invention.
Figure 3:
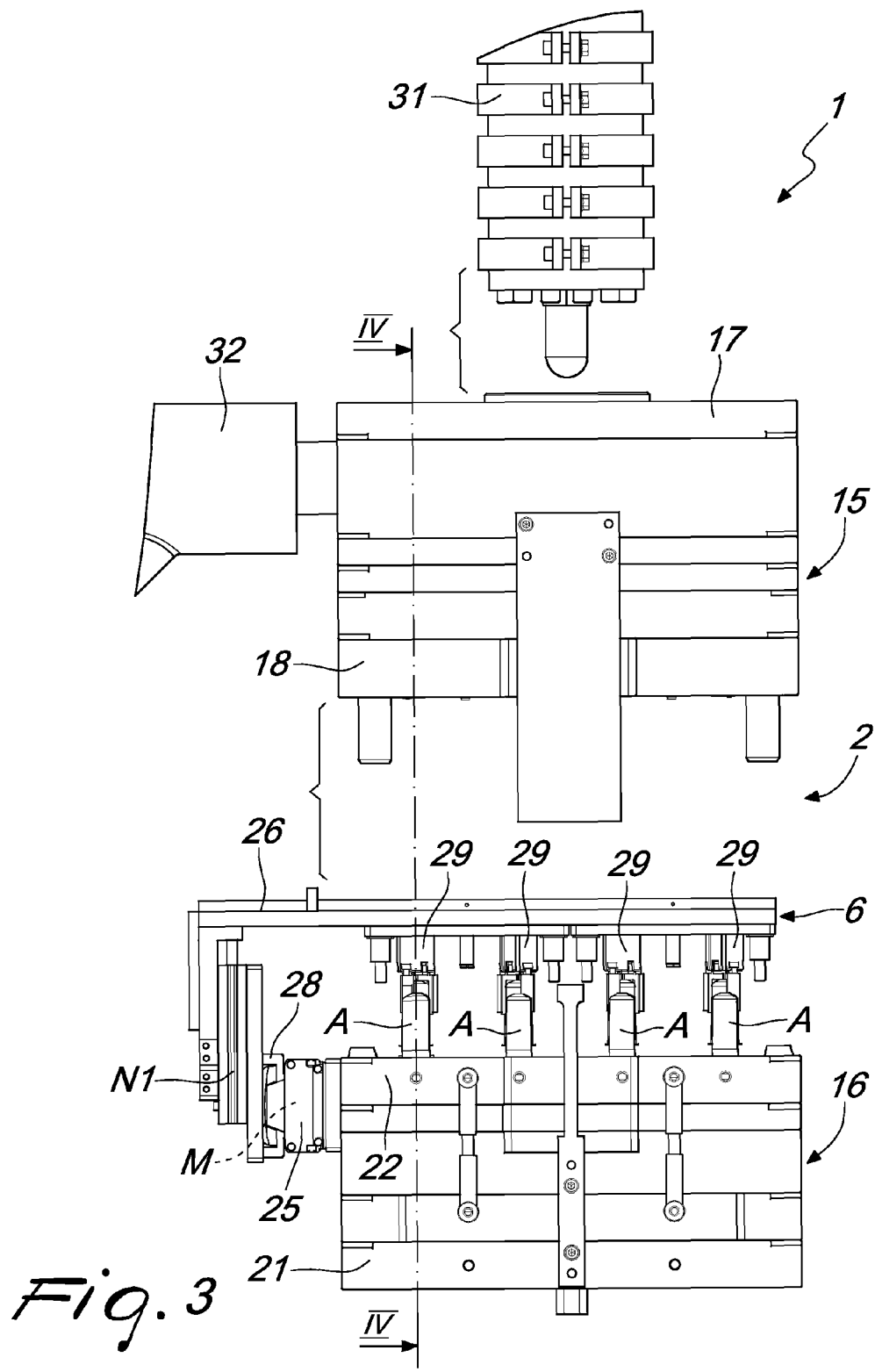
FIG. 3 is a schematic side view of FIG. 1.
Figure 4:
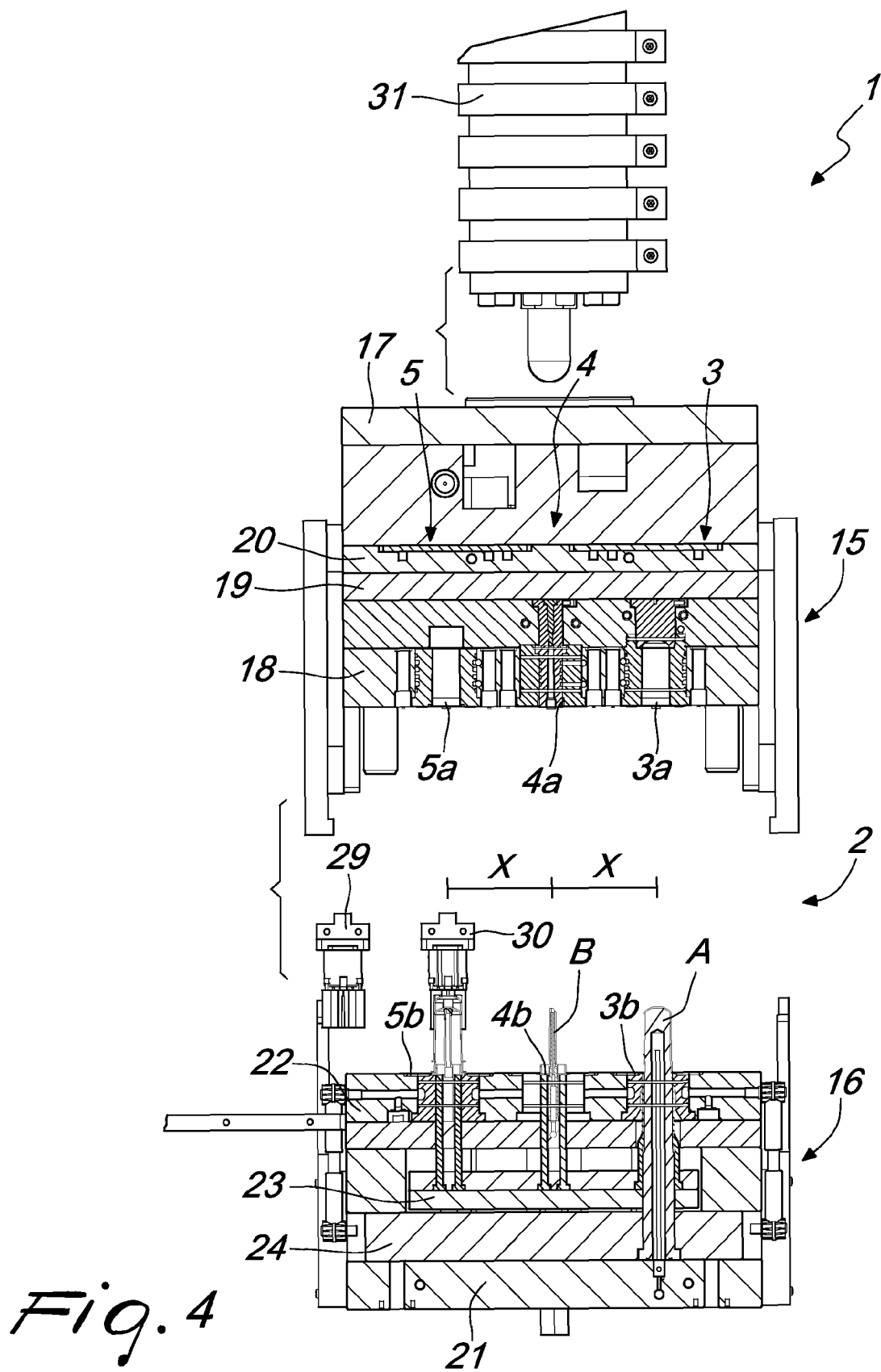
FIG. 4 is a schematic sectional view, taken along the line IV-IV of FIG. 3, of the apparatus according to the invention in an intermediate step of the production cycle.

With reference to FIG. 2, the part A (chamber body) comprises a hollow body 7 and a tubular connector 8 that is formed on a bottom 9 of the hollow body 7 of the part A; in the part A there is an opening 10 at the end of the hollow body 7 that lies opposite the bottom 9.

The part B (lid) comprises a tubular connector 11 for the passage of fluid, which is monolithic with a flange 12; in the part B there are one or more fluid inlet ports 13, and the tubular connector 11 is divided into two parts, respectively 11a and 11b, which are arranged on the opposite side with respect to the flange 12; the part 11a is designed to be mated with a tube of the blood circuit, for example a tube that leads to a patient or other, and the part 11b is designed to be inserted within the chamber formed by the part A of the chamber unit D and is substantially coaxial thereto.

The part A is joined to the part B and in particular to the flange 12 by overmolding the additional thermoplastic material C, which once it has solidified is designed to constitute a ring 14 of thermoplastic material that touches and embeds internally at least the perimetric profiles of the flange 12 and of the end of the part A in contact with it in order to close the opening 10.

The production unit 2 comprises a first fixed part 15 and a second movable part 16, which are anchored respectively to the fixed plane and to the movable plane of an injection press for plastic materials for the approach (opening) and spacing (closure) of the former with respect to the latter.

The first forming mold 3 is divided into two mold parts 3a and 3b, respectively a female mold part and a male plug for forming the part A.

The second forming mold 4 is divided into two mold parts 4a and 4b, respectively a female mold part and a male plug for forming the part B.

The assembly mold 5 is divided into two mold parts 5a and 5b, which are designed to accommodate respectively the part A and the part B and in which the female mold for forming the ring 14 of the additional overmolded thermoplastic material C is formed.

The first part 15 comprises a reference plate 17, with which a supporting plate 18 for the mold parts 3a, 4a and 5a is associated; a movable plate 19 and a corresponding abutment plate 20 are interposed between the reference plate 17 and the supporting plate 18; the reference plate 17, the supporting plate 18 and the abutment plate 20 are mutually jointly connected.

The second part 16 comprises a reference plate 21, with which a supporting plate 22 for the mold parts 3b, 4b and 5b is associated; a movable plate 23 and a corresponding abutment plate 24 are interposed between the reference plate 21 and the supporting plate 22; the reference plate 21, the supporting plate 22 and the abutment plate 24 are mutually jointly connected.

At least the assembly mold 5 can have means for retaining, for example by suction, the parts A and B formed beforehand respectively inside the mold parts 5a and 5b.

Further, the first and second forming molds 3 and 4 and the assembly mold 5 can be provided with a corresponding device, for example of a known type, for extracting respectively the formed parts A and B and the assembled chamber unit D.

Each extraction device can, for example, be associated with the corresponding mold part and be composed of two elements: a shaft and a telescopic extractor, which are mutually coaxial and perpendicular to the plates and inserted so that they can move, both with respect to the mold part with which they are associated and with respect to each other, and are coaxial to said mold part. The shaft, for example, is allowed to rotate and slide axially by a gear that is adapted to move it alternately between a configuration in which it is retracted into the mold part with which it is associated and a configuration in which it is extended toward the outside thereof, for the at least partial extraction of the part A or of the part B that are formed or of the assembled chamber unit.

The female mold parts 3a and 4a are formed in the first part 15 so that they are not aligned, with a predefined fixed center distance X; different and equivalent embodiments of the female mold parts 3a arid 4a are not excluded.

The axes of the three molds 3, 4 and 5 are mutually parallel and affect a same line L, along which they are distributed with a constant pitch that is equal to the center distance X.

The three molds 3, 4 and 5 in this configuration constitute a molding series.

The apparatus 1 advantageously comprises a plurality of molding series as defined above, which are arranged in parallel to each other; in the example shown in the figure there are four mutually parallel molding series.

The element supporting device 6 is constituted by a support 25 that is jointly associated with at least one of the supporting plates 18 and 22, respectively of the first and second parts 15 and 16 and at least one supporting bar 26, 27, which is rendered movable at right angles to the supporting plates 18 and 22 by actuation means M that are adapted to arrange it in a central position in the opening between the first part 15 and the second part 16.

The support 25 is external to the area occupied by the plates (by the first and second parts 15 and 16) and is jointly associated with the supporting plate 22 and therefore to the second movable part 16.

A slider 28 is associated slidingly with the support 25 and is interposed between the support and the supporting bar 26, 27; the slider 28 is advantageously C-shaped and is associated with the actuation means M, which are adapted to move it along a direction that is substantially parallel to the line L.

In particular, two supporting bars 26 and 27 are associated with the slider 28 and are drawn in translational motion along a direction that is substantially parallel to the line L; element holders 29 and 30, respectively for supporting the part A and the part B, are associated with said bars.

The actuation means comprise for example a linear actuator that moves the slider 28 alternately between a configuration for spacing from the plates, in which one is external to their work area, and first, second and third approach configurations, in which the supporting bars 26 and 27 and therefore the element holders 29 and 30 are extended within the opening between the first part 15 and the second part 16.

In the first approach configuration, the slider 28 is arranged so that the element holders 29 and 30 are aligned with the female mold parts 3a and 4a in order to receive from them the formed parts A and B; in the second approach configuration, the slider 28 is arranged so that the element holder 30 is aligned with the mold part 5a in order to release inside it the part B, while in the third approach configuration the slider 28 is arranged so that the element holder 29 is aligned with the mold part 5b in order to release the part A superimposed on the part B; the part A is designed to be inserted in the mold part 5b during the step for closure of the mold parts 5a and 5b.

The element holder 29 is arranged so that its longitudinal axis is parallel to the longitudinal axis of the element holder 30 and lies adjacent to the latter at a fixed distance with respect to it.

The center distance between the element holders 29 and 30 is fixed and is equal to the center distance or pitch X between the three mold parts 3a, 4a, 5a or 3b, 4b, 5b; likewise, the movement of the slider 28 is intermittent and stepwise, each stroke being equal to the center distance X or to multiples thereof.

The two element holders 29 and 30 are of the type with suction or mechanical grip, as in the example shown in the figures, in which the element holders 29 and 30 are of the type of pneumatic clamps, with internal ducts and integrated automatic closure valve, or of the telescopic type; the two element holders 29 arid 30, in particular, are associated with the slider 28 by means of the respective supporting bars 26 and 27; each one of them is provided with a respective actuator N1 and N2, for example, which are mutually independent, each of which is adapted to carry the respective supporting head (for mechanical grip or for suction) of the parts A and B toward and away from the respective mold parts 3b, 4b, 5a and 5b along a direction that is substantially parallel to the direction of mutual approach/spacing of the first part 15 with respect to the second part 16.

In the preferred embodiment shown in the figures, the element holders 29 and 30 are associated rotatably, with respect to their longitudinal axis, with the respective supporting bar 26 and 27 for the rotation respectively of the part A and of the part B with respect to their longitudinal axis and the corresponding positioning of said parts in the assembly mold 5.

Further, the actuation means M comprise for example a rack that is associated with the second plate 16 and in which the teeth mesh with a pinion that is associated rotatably with the slider 28, or alternately linear actuators for the stepwise translational motion of the slider 28 and therefore of the element holders 29 and 30 between the four configurations described above.

The above cited figures illustrate a first circuit 31 for the injection of the thermoplastic material, for forming the parts A and B, and a second circuit 32 for the injection of the additional thermoplastic material for overmolding the ring 14.

In particular, the first and second injection circuits, respectively 31 and 32, are mutually independent and are adapted to inject two different thermoplastic materials, for example having different chemical-physical characteristics or at least having different colors for color-base identification of the ring 14 and therefore of the chamber unit D.

The method according to the invention comprises the steps of:
  approaching the first part 15 and the second part 16 for the closure of the production unit 2 and therefore of the first and second forming molds 3 and 4; the slider 28 being in a configuration for spacing from the work area of the production unit 2;
  simultaneous forming, by injection molding of thermoplastic material, of the parts A and B;
  spacing of the first part 15 and of the second part 16 to open the production unit 2 and therefore the first and second forming molds 3 and 4, with simultaneous alignment of the element supporting device 6 with the central plane of the opening, the slider 28 being still in the spacing configuration;
  partial expulsion of the formed parts A and B from the corresponding female mold parts 3a and 4a, which remain in contact against the second part 16, in particular respectively on the mold parts 3a and 4a arid occupying the space interposed between the first part 15 at the second part 16 upon their opening;
  sliding of the slider 28, pushed by the actuator, in the first approach configuration, in which it is extended within the opening of the production unit 2 with the element holders 29 and 30 aligned with the female mold parts 3a and 4a and elongated so that the respective heads are extended toward them in order to receive the formed parts A and B;
  final expulsion of the parts A and B, which upon opening of the first forming mold 3 and of the second forming mold 4 remain respectively in contact against the mold parts 3b and 4b; the parts A and B being deposited on the corresponding element holders 29 and 30, to which they remain anchored by suction and/or mechanical grip;
  retraction of the heads of the element holders 29 and 30 with the parts A and B anchored to them, and sliding, with a stroke that is equal to twice the center distance X, of the slider 28 in the second approach configuration, in which it is extended within the opening of the production unit 2 with the element holder 30 aligned with the mold part 5a in order to release inside it the part B with a movement of elongation and subsequent retraction of the respective head;
  sliding, with a stroke equal to the center distance X, of the slider 28 in the third approach configuration, in which the element holder 29 is aligned with the mold part 5b in order to release inside it the part A, with a subsequent motion of elongation and retraction of the respective heads;
  retainment of the parts A and B inside the two mold parts 5a and 5b by suction;
  retraction of the slider 28 in the configuration for spacing it from the port of the production unit 2;
  approach of the first part 15 and of the second part 16 for the closure of the production unit 2 and therefore of the assembly mold 5;
  injection molding of thermoplastic material of the ring 14 that seals the two parts A and B;

spacing of the first part 15 and of the second part 16 for the opening of the production unit 2 and therefore of the assembly mold 5; once the assembly mold 5 has been opened, the chamber unit D remains in contact against the mold part 5a for extraction by one of the element holders 29 or 30 or other device for transporting the produced chamber unit D.

The apparatus 1 is thus ready for a new production cycle.

In practice it has been found that the described invention achieves the proposed aim and objects, in particular with the arrangement of the element supporting device so that it is associated directly with at least one of the supporting plates and conveniently on the movable one, the apparatus according to the invention being particularly precise and having a high efficiency.

Further, the possibility to have different circuits for the injection of different thermoplastic materials allows considerable flexibility and a wide variety of obtainable products.

The invention thus conceived is susceptible of numerous modifications and variations, all of which are within the scope of the appended claims.

All the details may further be replaced with other technically equivalent ones.

In practice, the materials used, as well as the shapes and dimensions, may be any according to requirements without thereby abandoning the scope of the protection of the appended claims.

The disclosures in Italian Patent Application No. MO2008A000164 from which this application claims priority are incorporated herein by reference.

Where technical features mentioned in any claim are followed by reference signs, those reference signs have been included for the sole purpose of increasing the intelligibility of the claims arid accordingly, such reference signs do not have any limiting effect on the interpretation of each element identified by way of example by such reference signs.

The invention claimed is:

1. An apparatus for molding and assembling a chamber unit for biomedical use, comprising a first supporting plate and a second supporting plate, which are mutually parallel and opposite and are allowed to move toward and away from each other, where said first supporting plate and second supporting plates are adapted for supporting mold parts of a first forming mold and of a second forming mold for the injection molding of thermoplastic material respectively in two molded parts of a chamber unit that are adapted to be mutually assembled, an assembly mold for the assembly, by overmolding additional thermoplastic material, onto said two molded parts of said first forming mold and said second forming mold, said assembly mold having retaining means for holding said two molded parts in said assembly mold, said apparatus having an element supporting device that is movable between said supporting plates by a first actuation means, said assembly mold being adapted to receive said parts from said first forming mold and said second forming mold to transfer said parts from said first forming mold and said second forming mold to said assembly mold, by said element supporting device that is directly slidingly associated, with at least one of said supporting plates, said element supporting device comprising at least one support and at least one supporting bar for supporting element holders, and having a slider between said support and said at least one supporting bar to render said supporting bar movable with an alternating stepwise rectilinear motion in a direction that is substantially parallel to said supporting plates by said first actuation means where said supporting bar is outside of the opening between said first supporting plate and said second supporting plate and first, second and third approach configurations, in which said element holders are extended within said opening respectively to receive said parts from said first forming mold and second forming mold before releasing said first mold part and said second mold part into said assembly mold.

2. The apparatus according to claim 1, characterized in that said first forming mold part, said second forming mold part and said assembly mold are arranged so that respective longitudinal axes of said first forming mold part, said second forming mold part and said assembly mold are mutually parallel and affect a same line that is perpendicular to them, said axes being distributed along said line with a constant pitch, defining a molding series.

3. The apparatus according to claim 1, characterized in that said apparatus comprises a plurality of said first forming mold part, said second forming mold part and said assembly mold arranged mutually in parallel.

4. The apparatus according to claim 1, characterized in that said apparatus comprises at least one first circuit, for the injection of said thermoplastic material into said first and second forming molds and at least one second circuit for the injection of said additional thermoplastic material into said assembly mold; said first and second injection circuits being mutually independent.

5. The apparatus according to claim 1, characterized in that said apparatus comprises at least one pair of element holders associated respectively with a pair of supporting bars, each one of said element holders of said pair for the grip and transport respectively of said mold parts.

6. The apparatus according to claim 5, characterized in that said element holders are a suction type and/or telescopic type and/or are provided with a mechanical grip and are mutually spaced by a distance that is substantially equal to said pitch.

7. The apparatus according to claim 1, characterized in that a stroke of said slider and/or said supporting bar between a first, second and third approach configurations is substantially equal to said pitch.

8. The apparatus according to claim 1, characterized in that said means for retaining said parts are suction means.

* * * * *